United States Patent [19]
Yoshida et al.

[11] Patent Number: 5,190,239
[45] Date of Patent: Mar. 2, 1993

[54] RETRACTOR SHAFT-ROTATING TYPE PRETENSIONER

[75] Inventors: Ryoichi Yoshida; Muneo Nishizawa, both of Shiga, Japan

[73] Assignee: Takata Corporation, Tokyo, Japan

[21] Appl. No.: 844,797

[22] Filed: Mar. 2, 1992

[30] Foreign Application Priority Data

Mar. 6, 1991 [JP] Japan ................................. 3-63716

[51] Int. Cl.$^5$ ............................................. B60R 22/46
[52] U.S. Cl. .................................... 242/107; 280/806
[58] Field of Search .......... 242/107, 107.4 A, 107.4 B, 242/107.4 R; 280/806, 807; 297/478, 480

[56] References Cited

U.S. PATENT DOCUMENTS

| | | | |
|---|---|---|---|
| 4,750,686 | 6/1988 | Fohl | 242/107 |
| 4,932,603 | 6/1990 | Yamanoi et al. | 242/107 |
| 5,098,030 | 3/1992 | Kosugi | 242/107 |
| 5,114,090 | 5/1992 | Lindblad | 242/107 |

FOREIGN PATENT DOCUMENTS 1-119454  11/1989  Japan .

*Primary Examiner*—John M. Jillions
*Attorney, Agent, or Firm*—Brumbaugh, Graves, Donohue & Raymond

[57] ABSTRACT

A retractor shaft-rotating type pretensioner for a vehicle seat belt has a pulley that is normally not engaged with the belt reel shaft of the retractor but is movable into driving engagement with the belt reel shaft upon operation of a power source and rotates it such as to rotate the reel shaft in the belt-winding direction and thereby apply a pretension to the belt. A movable spacer is detachably coupled to the pulley such that it is moved by the pulley upon rotation of the pulley by the power source from a retracted position to an engaging position in which it is engaged between the pulley and a portion of a fixed member and maintains the pulley in driving engagement with the reel shaft and in the engaging position is uncoupled from the pulley so that the pulley can continue to rotate.

3 Claims, 3 Drawing Sheets

RETRACTOR SHAFT-ROTATING TYPE PRETENSIONER

BACKGROUND OF THE INVENTION

The present invention relates to a pretensioner for a vehicle seat belt system and, in particular, to a pretensioner for tightening the belt by rotating the reel shaft of a belt retractor in the belt-winding direction.

Some vehicle seat belt systems have a pretensioner for tightening a belt worn by an occupant of the vehicle in order to tightly restrain the body of the occupant in an emergency and to prevent the occupant from undergoing secondary collision within the vehicle. Such a pretensioner is disclosed in Japanese Provisional Patent Publication No. 1-119454.

In the pretensioner of Japanese Publication No. 1-119454, a pulley connected to the reel shaft of a seat belt retractor by a coupling device is rotated, thereby to tighten the belt by a drive unit (power source) that pulls a tension cable wound on the periphery of the pulley. The coupling device comprises a gear fixed on the reel shaft and a gear fixed on the pulley. The pulley is supported on a guide unit (swing crank), and the guide unit is normally held in a "set" position in which the gears are disengaged by a holding unit (shear pin). When the drive unit is triggered, the holding unit releases the guide unit, which pivots to enable the gears to engage. After the gears are engaged, the holding unit releases the pulley so that it can rotate the reel shaft.

The operation of the holding unit is such that the rotation of the pulley must be restricted until the gears are engaged with each other, and this requires a holding unit having a high accuracy (specifically, a shear pin with an accurate shear load) that operates in two steps. Because a pretensioner must operate virtually instantaneously, in the order of a millisecond, even a slight change in resistance can greatly alter the operation of the unit. Since the pulley is supported by the guide unit (i.e., a swing crank) in the above device, a sturdy guide unit to match the operating power is needed, and there is a problem of an increase in power loss to operate the guide unit.

SUMMARY OF THE INVENTION

To solve the above problems, it is an object of the present invention to provide a retractor shaft-rotating type pretensioner, which operates in a manner generally similar to that of the above-described known pretensioner but does not involve a sequential operation consisting of engagement of the pulley with the retractor belt reel shaft followed by rotation of the pulley.

There is provided, in accordance with the present invention, a retractor shaft-rotating type pretensioner for a vehicle seat belt having a pulley that is normally not engaged with the belt reel shaft of the retractor but is movable into driving engagement with the belt reel shaft upon operation of a power source such as to rotate the reel shaft in the belt-winding direction and thereby apply a pretension to the belt. The invention is characterized in that a movable spacer is detachably coupled to the pulley such that it is moved by the pulley upon rotation of the pulley by the power source from a retracted position to an engaging position in which it is engaged between the pulley and a portion of a fixed member and maintains the pulley in driving engagement with the reel shaft and in the engaging position is uncoupled from the pulley so that the pulley can rotate.

In preferred embodiments, the invention is further characterized in that the fixed member includes a guideway along which the spacer is guided upon movement from the retracted position to the engaging position, and the fixed member has a surface spaced apart from the portion engaged by the spacer and located such as to maintain the pulley in engagement with the reel shaft in cooperation with the spacer.

In a pretensioner according to the present invention, the pulley is moved upon operation of the power source into driving engagement with the reel shaft, and when the pulley is engaged with the reel shaft, the spacer is moved upon rotation of the pulley to the engaging position in which it maintains the engagement of the pulley with the reel shaft. In the engaging position, the spacer is uncoupled from the pulley, thereby enabling the pulley to continue to rotate, driven by the power source, and to correspondingly rotate the reel shaft of the retractor. A length of the seat belt is, accordingly, wound onto the reel shaft, and tension is thereby established in the seat belt.

DETAILED DESCRIPTION OF THE PREFERRED EMBODIMENTS

Figure 1:
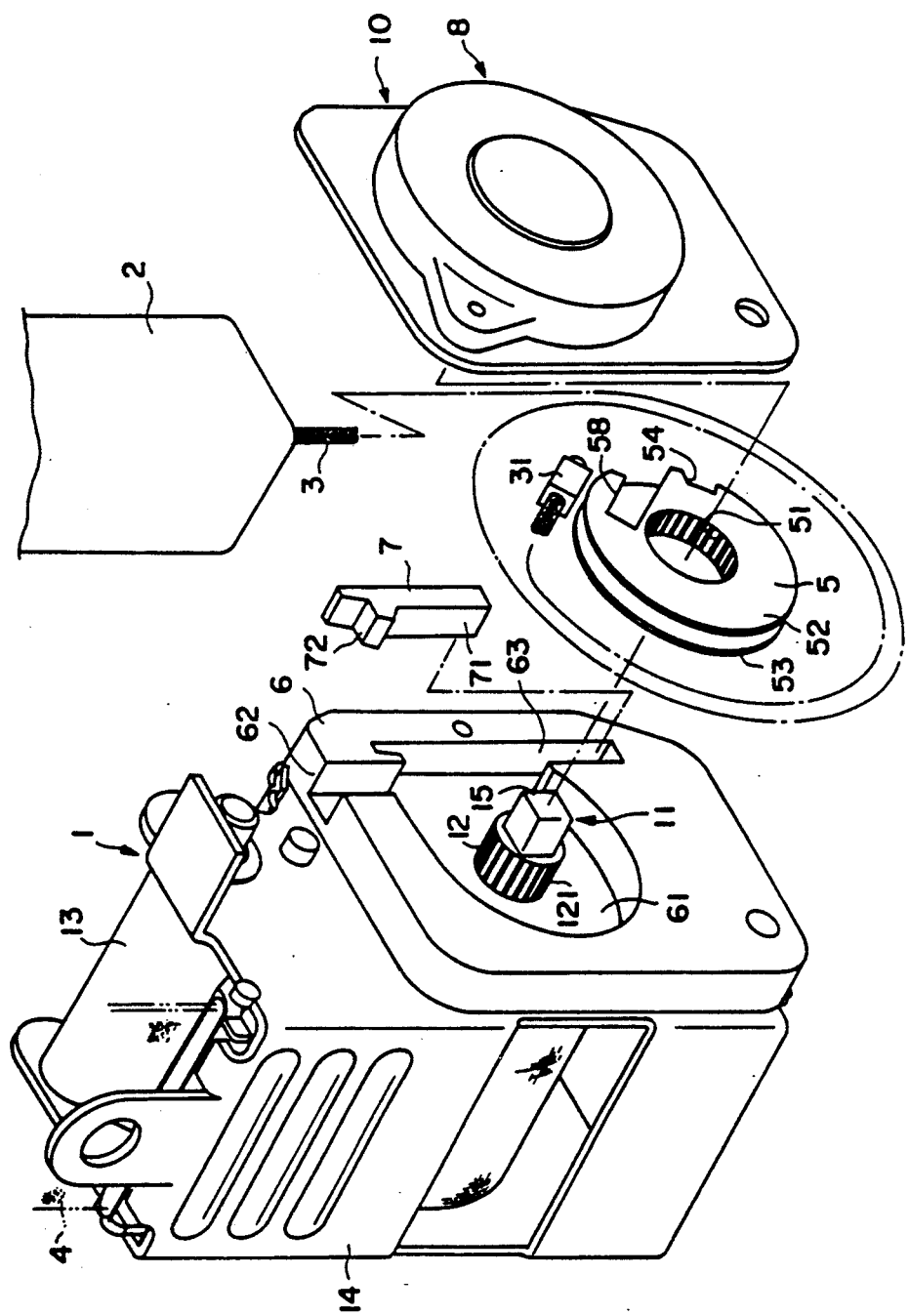
FIG. 1 is an exploded pictorial view of an embodiment of a pretensioner according to the present invention.

In the embodiment, referring to FIG. 1, a stranded wire cable 3 is connected between a power source 2 and a pulley 5 that is engageable with a belt reel shaft 11 of a seat belt retractor 1, and pretension is imparted to a belt 4 of a seat belt system by rotating the take-up shaft 11 in the belt-winding direction. Thus, a retractor shaft-rotating type pretensioner is provided.

Although the embodiment has no special means, such as a cam, for engaging the pulley 5 with the reel shaft 11 of the retractor 1, a spacer 7 is provided, which is guided by a portion of a fixed member 6 and is movable to an engaging position between the member 6 and the pulley 5 in which it keeps the pulley engaged with the reel shaft.

In particular, the seat belt retractor 1 is of a previously known design that includes a belt-clamping mechanism 13. The fixed member 6 is in the form of a block that is mounted on one side wall of the retractor frame 14 by suitable means (not shown). The block has a generally circular recess 61 that receives the pulley, a channel 62 leading generally tangentially from the recess in the direction of the power source 2 through which the cable 3 passes from the pulley to the power source, and a guide channel 63 for the spacer 7.

A pinion gear 12 having a square (or otherwise non-round) hole is affixed on a portion of a matching shape of the retractor reel shaft 11, whereby the gear rotates with the reel shaft. A portion 15 of the reel shaft projects outwardly with respect to the gear 12 and is connected to one end of a spiral winding spring of the retractor (not shown).

The pulley 5 is annular and has on its inner circumferential wall, which is of a diameter slightly greater than that of the gear 12, gear teeth 51 that mesh with the teeth 121 of the gear 12. The side flanges 52 and 53 of the pulley 5 have matching notches in their edges, only one of which, designated 54, is visable in FIG. 1.

The cable 3 is wound onto the pulley and is anchored to it by an end block 31 that is received in a notch 58 in the flange 52, which is formed by cutting a portion of the flange in a generally tangential direction. The cable makes approximately two turns around the pulley from the end block, leads away from the pulley through the channel 62 to the power source, and is suitably fastened to the piston of the power source 2.

The spacer 7, which is movably received in the spacer guide channel 63, has an elongated, straight body portion 71 and a projection 72 that is received in the notch 54 in the pulley flange 52 and the matching notch (not shown) in the flange 53 and by which it is detachably coupled to the pulley. As will be more fully apparent from the description below, the body portion 71 of the spacer 7 has a thickness such that when it is located between the outer periphery of the pulley and the guiding side wall of the channel 63 in the block 6, it maintains the internal teeth 51 of the pulley in meshing and driving engagement with the teeth 121 of the pinion gear 12 on the retractor reel shaft.

A cover 10 fits over the block 6, and the winding spring assembly 8 of the retractor is received within the cover.

Figure 2:
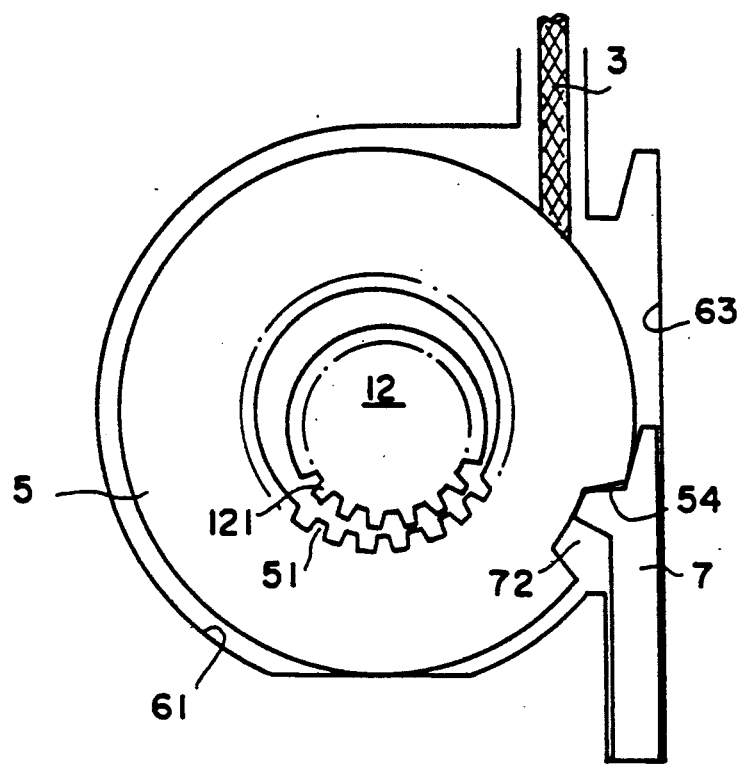
FIG. 2 is a schematic side view showing the configuration of the pretensioner in the "set" position.

In the description below, the words "up" and "down" or "left" and "right" are used to indicate the positions in the figures of the drawings and do not necessarily indicate "up" and "down" or "left" and "right" in an actual pretensioner. In the "set" position (FIG. 2), the pulley 5 resides in the pulley-receiving recess 61 of the block 6 with the lower end of each flange 52 and 53 supported by the lowermost wall surface, and the spacer 7 is located in its retracted position at the lowermost part of the guide channel 63 with its projection 72 coupled to the pulley by engagement with the notch 54 in the flange 52 and the matching notch (not shown) in the flange 53. To hold the pulley 5 at this position, a shear pin (not shown) can be used for temporary fixing. The external teeth 121 of the gear 12 and the internal teeth 51 of the pulley are disengaged with a certain clearance, and the retractor 1 can function normally.

Figure 3:
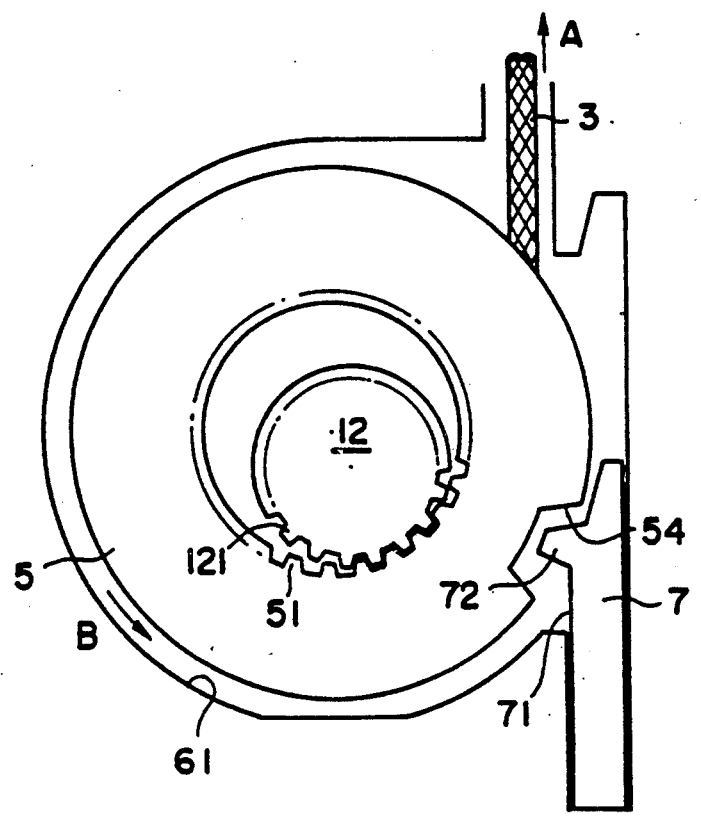
FIG. 3 is a schematic side view showing the configuration of the pretensioner just after the power source has been triggered.

When a high acceleration G is applied, due to a vehicle collision, under this set condition of the pretensioner and the power source 2 is triggered in response to detection of the acceleration by a sensor, the cable 3 is pulled in the direction of the arrow A (FIG. 3) into the power source 2. The shear pin (not shown) shears, and the pulley 5 with the cable 3 wound on it is pulled upward, whereupon external teeth 121 of the gear 12 and the internal teeth 51 of the pulley 5 are engaged in the lower portion. The pulley 5 moves freely because there is no restriction on the upward movement of the pulley 5 or to rotation of the pulley in the direction B. As a result, even if the tips of the teeth 121 and 51 collide against each other, meshing of the teeth 121 with the teeth 51 can be established by a small rotation of the pulley 5 in the counterclockwise direction B.

Figure 4:
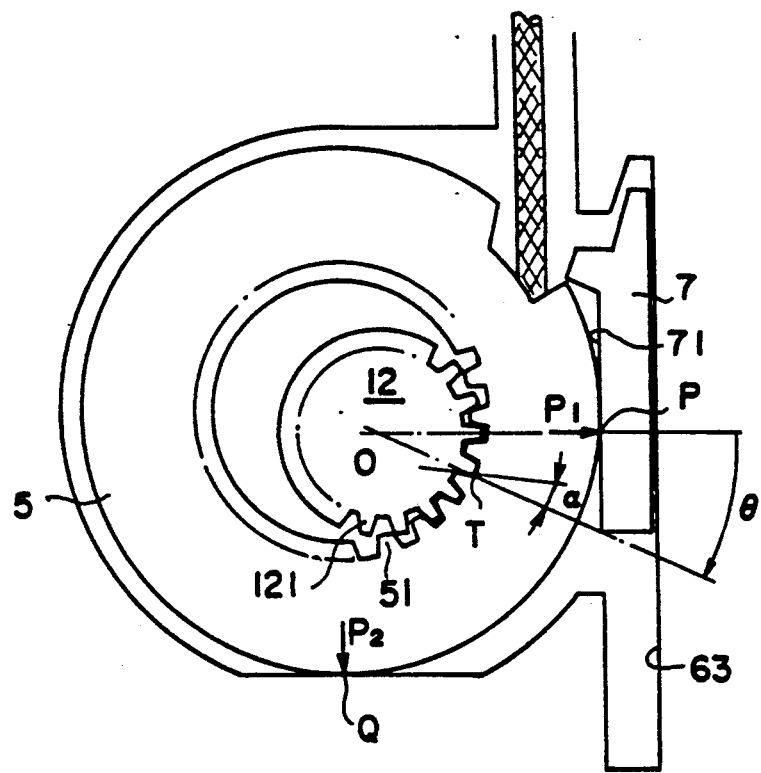
FIG. 4 is a schematic side view of the pretensioner in the final engaging position of the spacer after the spacer has been uncoupled from the pulley.

When the pulley 5 is rotated and the spacer 7 is pulled part way up, the pulley 5 is pushed leftward, and the region of engagement between the teeth 121 and the teeth 51 changes. When the pulley 5 is rotated further by the cable, the spacer 7 is pulled up to the top of the channel 63, whereupon the projection 72 becomes uncoupled from the notch 54. FIG. 4 shows the position where the coupling between the pulley and the spacer is released. In that position, the body portion 71 of the spacer 7 remains interposed between the pulley 5 and guide surface of the guide channel 63, and the engagement of the external teeth 121 of the gear with the internal teeth 51 of the pulley is maintained.

After the pulley 5 is uncoupled from the spacer, the pulley 5 continues to rotate and is supported at points P and Q in the position shown in FIG. 4. This rotation is transmitted to the retractor reel shaft 11 through the pinion gear 12, and a portion of the belt 4 is wound onto the reel, which occurs very rapidly so that the belt is pretensioned before the body of the occupant is moved by inertia.

As shown in FIG. 4, in the arrangement of the above embodiment, the engaging position T of a given tooth 51 with a tooth 121 is deviated downward by an angle $\Theta$ ("engaging angle") from a line that connects the axis O of rotation of the gear 12 and the contact point P between the pulley 5 and the spacer 7. This is to reduce the contact or pressure force $P_1$ exerted by the pulley 5 on the spacer 7 at the sliding contact point P between the pulley 5 and the spacer 7.

In particular, when the pulley 5 is rotated counterclockwise, supported at the points P and Q, as shown in FIG. 4, the engaging position T should be selected so that the engaging angle $\Theta$ falls between 0° and 90° from a theoretical viewpoint. Actually however, when an internal tooth 51 is engaged with an external tooth 121 during operation, the pressure force $P_1$ due to the engaging pressure angle $\alpha$ thrusts the spacer 7 away. When the engagement becomes shallower because of this force, the pressure force $P_1$ is increased because the engaging pressure angle $\alpha$ is larger at the tips of the teeth of the gear. This increase in the pressure force $P_1$ acts as a force tending to disengage the teeth. If, however, the engaging angle $\Theta$ is made to be closer to the engaging pressure angle $\alpha$, as shown in the figure, the influence of the engaging pressure angle $\alpha$ can be minimized, and the engagement of the gear can be maintained with a minimum pressure force $P_1$. The setting of the actual engaging angle $\Theta$ can be established by taking the movement of the pulley 5 and the pressure force $P_2$ on the point Q into account.

Therefore, it is possible according to the pretensioner of the above embodiment to minimize the sliding resistance due to friction at the supporting point P when the pulley 5 is rotated, to maintain the engagement of the gear, and to efficiently convert tension force on the cable 3 to rotating force of the reel shaft 11.

Having now fully described an embodiment of the invention, it will be apparent to those skilled in the art that many changes and modifications can be made according to the actual conditions and the selection of a detailed design without departing from the spirit or scope of the invention as set forth in the claims.

For example, a particular type of power source to pull out the cable is used in the above embodiment, but it is also possible to rotate the pulley 5 directly using a strong torsion coil spring. Also, while a gear is used to engage the pulley 5 with the reel shaft 11 in the above embodiment, frictional engagement may be adopted.

Thus, there is provided, in accordance with the present invention, a pretensioner that establishes and maintains engagement of a pulley with a reel shaft without the stepwise control action of a previously known pretensioner. Accordingly, the operation of a retractor shaft-rotating type retractor is made more reliable.

We claim:

1. A retractor shaft-rotating type pretensioner for a vehicle seat belt having a pulley that is normally not engaged with the belt reel shaft of a retractor but is movable into driving engagement with the belt reel shaft upon operation of a power source such as to rotate the reel shaft in the belt-winding direction and thereby apply a pretension to the belt, characterized in that a movable spacer is detachably coupled to the pulley such that it is moved by the pulley upon rotation of the pulley by the power source from a retracted position to an engaging position in which it is engaged between the pulley and a portion of a fixed member and maintains the pulley in driving engagement with the reel shaft and in the engaging position is uncoupled from the pulley so that the pulley can rotate.

2. A retractor shaft-rotating type pretensioner according to claim 1 and further characterized in that the fixed member includes a guideway along which the spacer is guided upon movement from the retracted position to the engaging position.

3. A retractor shaft-rotating type pretensioner according to claim 1 and further characterized in that the fixed member has a surface spaced apart from said portion located such as to maintain the pulley in engagement with the reel shaft in cooperation with the spacer.

* * * * *